United States Patent
Greyson et al.

(10) Patent No.: US 12,338,364 B2
(45) Date of Patent: Jun. 24, 2025

(54) METHOD FOR APPLYING A COATING COMPOSITION TO A SUBSTRATE

(71) Applicants: Rohm and Haas Company, Collegeville, PA (US); Dow Global Technologies LLC, Midland, MI (US)

(72) Inventors: Eric C. Greyson, Blue Bell, PA (US); Joy A. Gallagher, Eagleville, PA (US); Richard Cooper, Schwenksville, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/860,253

(22) PCT Filed: May 20, 2022

(86) PCT No.: PCT/US2022/030166
§ 371 (c)(1),
(2) Date: Oct. 25, 2024

(87) PCT Pub. No.: WO2023/224630
PCT Pub. Date: Nov. 23, 2023

(65) Prior Publication Data
US 2025/0109301 A1    Apr. 3, 2025

(51) Int. Cl.
*C09D 5/02*    (2006.01)
*C09D 5/33*    (2006.01)
*C09D 7/61*    (2018.01)
*C09D 7/65*    (2018.01)
*C09D 133/06*  (2006.01)
*E01F 9/518*   (2016.01)

(52) U.S. Cl.
CPC ............. *C09D 5/022* (2013.01); *C09D 5/004* (2013.01); *C09D 5/028* (2013.01); *C09D 7/61* (2018.01); *C09D 7/65* (2018.01); *C09D 133/064* (2013.01); *E01F 9/518* (2016.02)

(58) Field of Classification Search
CPC . C09D 5/022; C09D 7/65; C09D 7/61; C09D 5/004; C09D 5/028; C09D 133/064; E01F 9/518
See application file for complete search history.

(56) References Cited

U.S. PATENT DOCUMENTS

| | | | |
|---|---|---|---|
| 5,672,379 | A | 9/1997 | Schall et al. |
| 5,688,853 | A | 11/1997 | Salter et al. |
| 5,731,377 | A | 3/1998 | Friel |
| 6,930,141 | B2 | 8/2005 | Gebhart et al. |
| 8,435,340 | B2 | 5/2013 | Wheeler et al. |
| 2004/0161542 | A1 | 8/2004 | Ziemann et al. |
| 2005/0202176 | A1 | 9/2005 | Brady et al. |
| 2007/0218291 | A1 | 9/2007 | Chiou et al. |
| 2009/0004468 | A1 | 1/2009 | Chen et al. |
| 2010/0144937 | A1 | 6/2010 | Fu et al. |
| 2013/0216832 | A1 | 8/2013 | Japtap et al. |
| 2024/0247151 | A1 | 7/2024 | Greyson et al. |

FOREIGN PATENT DOCUMENTS

| EP | 3467053 A1 * | 4/2019 | ........... C09D 125/14 |
|---|---|---|---|
| JP | 05382401 | 1/2014 | |
| JP | 05564342 | 7/2014 | |

\* cited by examiner

*Primary Examiner* — Robert S Walters, Jr.
(74) *Attorney, Agent, or Firm* — Reid S. Willis

(57) ABSTRACT

The present invention relates to a method comprising the steps of a) applying a 0.1-mm to 2-mm thick layer of a pigmented coating composition onto a cement, concrete, or asphalt substrate, and b) allowing the coating to composition to dry. The method of the present invention is useful for preparing a traffic paint with improved color retention and durability.

17 Claims, No Drawings

METHOD FOR APPLYING A COATING COMPOSITION TO A SUBSTRATE

BACKGROUND OF THE INVENTION

The present invention relates to a method for applying a coating composition to a substrate, more particularly, to a concrete or asphalt substrate.

Waterborne quick-drying traffic paint is a popular and low-cost product used to improve roadway safety. To be effective as a traffic paint, four critical properties are required: (i) paint durability on the road as measured by presence and retroreflectivity over time; (ii) color retention and resistance to dirt, tire marks and other stains; (iii) dry time at high humidity; and (iv) paint stability. Of these, color retention presence a special challenge. Although this property can be improved by reducing the volume fraction of film-forming latex in the paint in favor of increased levels of non-film-forming pigment or filler, paint durability on the road has often found to be catastrophically compromised. Accordingly, it would be an advance in the art of waterborne traffic paints to discover a way to improve color retention without sacrificing paint durability.

SUMMARY OF THE INVENTION

The present invention relates to a method comprising the steps of a) applying a 0.1-mm to 2-mm thick layer of a pigmented coating composition onto a cement, concrete, or asphalt substrate, and b) allowing the coating to composition to dry;
wherein the pigmented coating composition comprises an aqueous dispersion of 1) first polymer particles having a calculated $T_g$ in the range of from −25° C. to 50° C.; 2) second polymer particles having a calculated $T_g$ in the range of from 30° C. to 110° C.; 3) extender particles; 4) pigment particles; and 5) ammonia or a volatile amine or a salt thereof;
with the proviso that the second polymer particles have a $T_g$ of at least 20° C. higher than the first polymer particles, wherein, based on the weight of the composition:
the first and second polymer particles together have a solids content in the range of from 10 to 20 weight percent;
the extender particles have a solids content in the range of from 45 to 70 weight percent;
the pigment particles have a solids content in the range of from 3 to 15 weight percent; and
the composition has a total solids content in the range of from 60 to 85 weight percent;
wherein the w/w ratio of the first polymer particles to the second polymer particles is in the range of from 30:70 to 90:10.

The method for preparing the coated concrete substrate of the present invention provides a coated traffic paint with excellent color retention and durability.

DETAILED DESCRIPTION OF THE INVENTION

The present invention is a method comprising the steps of a) applying a 0.1-mm to 2-mm thick layer of a pigmented coating composition onto a cement, concrete, or asphalt substrate, and b) allowing the coating to composition to dry; wherein the pigmented coating composition comprises an aqueous dispersion of 1) first polymer particles having a calculated $T_g$ in the range of from −25° C. to 50° C.; 2) second polymer particles having a calculated $T_g$ in the range of from 30° C. to 110° C.; 3) extender particles; 4) pigment particles; and 5) ammonia or a volatile amine or a salt thereof;
with the proviso that the second polymer particles have a $T_g$ of at least 20° C. higher than the first polymer particles, wherein, based on the weight of the composition:
the first and second polymer particles together have a solids content in the range of from 10 to 20 weight percent;
the extender particles have a solids content in the range of from 45 to 70 weight percent;
the pigment particles have a solids content in the range of from 3 to 15 weight percent; and
the composition has a total solids content in the range of from 60 to 85 weight percent;
wherein the w/w ratio of the first polymer particles to the second polymer particles is in the range of from 30:70 to 90:10.

The first and second polymer particles may be acrylic, styrene-acrylic, urethane, alkyd, vinyl ester (e.g., vinyl acetate and vinyl versatate), and vinyl acetate-ethylene (VAE) polymeric dispersions, and combinations thereof. The polymer particles, which are preferably acrylic or styrene-acrylic latex particles, preferably have a z-average particle size by dynamic light scattering in the range of from 50 nm to 600 nm, more preferably in the range of from 70 nm to 300 nm.

As used herein, an "acrylic latex" comprises at least 30 weight percent, preferably at least 50 weight percent, and more preferably at least 80 weight percent structural units of an acrylate and/or methacrylate monomer. Acrylic latexes preferably comprise aqueous dispersions of polymer particles functionalized with methyl methacrylate and one or more acrylates selected from the group consisting of methyl acrylate, ethyl acrylate, n-butyl acrylate, 2-ethylhexyl acrylate, and 2-propylheptyl acrylate. As used herein, the term "structural unit" of a recited monomer refers to the remnant of the monomer after polymerization. For example, a structural unit of n-butyl acrylate is as illustrated:

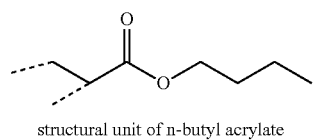

structural unit of n-butyl acrylate where the dotted lines represent the points of attachment of the structural unit to the polymer backbone.

Acrylic latexes also preferably comprise structural units of an acid monomer including carboxylic acid, sulfur acid, and phosphorus acid monomers, as well as salts thereof, and combinations thereof. Examples of suitable carboxylic acid monomers include methacrylic acid, acrylic acid, and itaconic acid and salts thereof; examples of suitable sulfur acid monomers include sulfonic acid monomers such as sulfoethyl methacrylate, sulfopropyl methacrylate, styrene sulfonic acid and salts thereof, vinyl sulfonic acid and salts thereof, and 2-acrylamido-2-methyl propanesulfonic acid and salts thereof; examples of suitable phosphorus acid monomers include phosphonates and dihydrogen phosphate esters of an alcohol in which the alcohol contains or is substituted with a polymerizable vinyl or olefinic group.

Preferred dihydrogen phosphate esters are phosphates of hydroxyalkyl acrylates or methacrylates, including 2-phosphoethyl methacrylate (PEM) and salts thereof.

The first polymer particles have a $T_g$, as calculated by the Fox equation, in the range of from −25° C., preferably from −15° C., and more preferably from −10° C., to 50° C., preferably to 30° C. The second polymer particles preferably have a $T_g$, as calculated by the Fox equation, in the range of from 30° C., preferably from 50° C., to 110° C., preferably to 90° C. The second polymer particles have a $T_g$ that is at least 20° C. higher than the second polymer particles.

The w/w ratio of first polymer particles to the second polymer particles is in the range of from 30:70, preferably from 50:50 to 90:10, preferably to 70:30, and the first and second polymer particles together have a solids content in the range of from 10 to 20, preferably to 18, and more preferably to 17 weight percent As used herein, the term extender refers to any white, translucent, or semi-transparent particulate filler that does not impart a significant (non-white) color or hue. Examples of suitable inorganic extenders include silica; silicates and aluminosilicates such as talc, clay, mica, and sericite; $CaCO_3$; nepheline syenite; feldspar; wollastonite; kaolinite; dicalcium phosphate; and diatomaceous earth. Preferably, the extender particles have a solids content in the range of from 50 to 65 weight percent, based on the weight of the composition. A preferred extender is $CaCO_3$.

The pigment particles include opacifying pigments such as $TiO_2$, ZnO, and hollow opacifying pigments (opaque polymers), as well as colorants such as yellow iron oxide, red iron oxide, and carbon black. Preferred pigment particles are $TiO_2$ particles at a solids content concentration in the range of from 5 to 10 weight percent, based on the weight of the composition.

The composition further includes ammonia or a volatile amine or a salt thereof in sufficient amounts to achieve a pH in the range of 8, preferably from 8.5, more preferably from 9, to 12, preferably to 11. As used herein, the term "volatile amine" is an amine with a boiling of not greater than 250° C. Examples of suitable volatile amines include 2-amino-2-methyl-1-propanol, dimethylaminoethanol, and monoisopropanol amine.

The composition advantageously further comprises, based on the weight of the composition, from 0.01, more preferably from 0.05 weight percent to 2, more preferably to 1, and most preferably to 0.5 weight percent of a polyamine, which is a polymer containing at least 5 amine groups. Examples of polyamines include polyethyleneimines (polyaziridines) and polymers or copolymers of a monoethylenically unsaturated amine comprising from 20, preferably from 50 weight percent, to 100 weight percent structural units of the monoethylenically unsaturated amine. Classes of monoethylenically unsaturated amines suitable for making polyamine homopolymers and copolymers include alkylaminoalkyl acrylates and methacrylates, acrylamides, methacrylamides, N-acryloxyalkyl-oxazolidines, N-acryloxyalkyltetrahydro-1,3-oxazines, and hydroxyalkylaminoethyl acrylates and methacrylates. Specific examples of suitable monoethylenically unsaturated amines include dimethylaminoethyl acrylate, dimethylaminoethyl methacrylate, N-β-aminoethyl acrylamide, N-β-aminoethyl methacrylamide, N-(monomethylaminoethyl)-acrylamide, N-(monomethylaminoethyl)-methacrylamide, 2-(3-oxazolidinyl)ethyl methacrylate, 2-(3-oxazolidinyl)ethyl acrylate, 3-(γ-methacryloxypropyl)-tetrahydro-1,3-oxazine, 3-β-methacryloxyethyl-2-methyl-2-propyloxazolidine, 3-(β-methacryloxyethyl)-2,2-pentamethylene oxazolidine, N-2-(2-methacryloxy)ethyl-5-methyl-oxazolidine, N-2-(2-methacryloxy)ethoxy-5-methyl-oxazolidine, N-2-(2-acryloxy)ethyl-5-methyl-oxazolidine, 2-(3-oxazolidinyl) ethyl methacrylate, 2-((2-hydroxyethyl)amino)ethyl methacrylate, 2-((2-hydroxyethyl)amino)ethyl methacrylate, 2-((2-hydroxypropyl)amino)ethyl methacrylate, and 2-((2-hydroxypropyl)amino)ethyl acrylate. A preferred polyamine is poly(oxazolidinoethyl methacrylate).

The weight average molecular weight ($M_w$) of the polyamine, measured using size exclusion chromatography (SEC), as described in U.S. Pat. No. 10,662,337, column 5, line 50 to 67, is preferably in the range of from 500, more preferably from 5000, and most preferably from 10,000 g/mol, to preferably 500,000, more preferably to 100,000, and most preferably to 80,000 g/mol.

The pigment volume concentration of the composition is preferably in the range of from 60, preferably from 65, to 90, preferably to 85. PVC is calculated by the following equation:

$$PVC = \left[ \frac{Vol(\text{Opacifying Pigment} + \text{Extender} + 2nd \text{ Polymer Particles})}{\begin{array}{c} Vol(\text{Opacifying Pigment} + \text{Extender} + \\ 1st \text{ and } 2nd \text{ Polymer Particles}) \end{array}} \right] \times 100$$

The composition used in the method of the present invention advantageously comprises one or more additional materials including surfactants, defoamers, dispersants, coalescents, rheology modifiers, and solvents. Coalescents are especially desirable for first polymer particles that are not readily film forming at ambient temperatures. For such first polymer particles, a coalescent is used at sufficiently high concentrations to promote film formation of the first polymer particles at ambient temperatures, but low enough so as not to promote film formation of the second polymer particles. Thus, the first polymer particles are film-forming alone or in the presence of a coalescent. As used herein, "film-forming" refers to a minimum film formation at or below ambient temperature, preferably ≤22° C. in accordance with ASTM D2354.

The composition is advantageously applied to a cement, concrete, or asphalt substrate at a wet thickness coating in the range of from 0.1 mm, or from 0.3 mm to 5 mm, or 3 mm, then allowed to dry. The method may include drop-on addition of glass beads, sand, quartz, $Al_2O_3$, and bauxite before the coating dries on the substrate. Methods of surface treatment with such additives are well known in the art. (See U.S. Pat. No. 5,672,379, col. 15, lines 3-35.)

It has surprisingly been discovered that critical combinations of comparatively high $T_g$ non-film-forming second polymer particles and comparatively low $T_g$ film-forming first polymer particles provide improved color retention with little to no loss of durability. In contrast, higher concentrations of extender particles and lower concentrations of low $T_g$ first polymer particles provide little to no improvement in color retention and significant loss of durability.

EXAMPLES

In the following examples, dispersant refers to TAMOL™ 963 Dispersant (A Trademark of The Dow Chemical Company or its Affiliates); defoamer refers to Drewplus L-493 Defoamer; $TiO_2$ refers to TiPure R-900 titanium dioxide; $CaCO_3$ refers to Hubercarb Q6 calcium carbonate; attapulgite refers to Attagel 50 Attapulgite gel; coalescent refers to Texanol Coalescent; and HEC refers to Natrosol H4BR hydroxyethylcellulose.

All aqueous dispersions of polymer particles (latexes) were prepared using standard emulsion polymerization techniques. The monomer concentrations used to make the first polymer particles were 56.3% butyl acrylate, 42.2% methyl methacrylate and 1.5% methacrylate acid. The monomer concentrations used to make the second polymer particles were 20% butyl acrylate, 78.7% methyl methacrylate and 1.5% methacrylic acid. The first and second polymer particles had a z-average particle size by dynamic light scattering of approximately 200 nm and a solids content of 50 weight percent. To each latex was added poly(oxazolidinoethyl methacrylate) (4.6 g of a 27% w/w aqueous solution added per 100 g of latex solids).

Aqueous road marking compositions were prepared by adding the first and second polymers (to a plastic pail while stirring with an overhead mixer. Dispersant (0.33 weight percent), defoamer (0.25 weight percent), attapulgite (0.08 weight percent), TiO$_2$, CaCO$_3$, and methanol (1.6 weight percent) were sequentially added under high shear agitation and then mixed for 15 min. Methanol, coalescent, water, and the HEC (2% w/w aq. solution) were then added sequentially, at an agitation speed necessary to maintain a deep vortex. Once all the ingredients were added, the formulation was mixed for 15 min. The formulation was then allowed to stand for at least 24 h before application. The amount of HEC was varied to target an initial viscosity of 85 to 90 KU.

The aqueous compositions were spray applied to a Portland cement road by means of a walk-behind, self-propelled striping machine in accordance with ASTM D713. The compositions were applied at a thickness of 380 μm as transverse lines to a lane traversed by ~10,000 vehicles per day averaged over the course of a year. The lines were allowed to dry for at least 2 h before traffic was allowed to resume. The durability of the coatings was measured according to ASTM D913 and recorded as percent paint presence remaining in the wheel track region of the painted lines.

Table 1 shows the impact of several properties on the substitution of varying amounts of low $T_g$ polymer with either high $T_g$ polymer or CaCO$_3$ in the paint. Comparative Example 1 uses 15.1 wt % the low $T_g$ polymer. Inventive Examples 1, 2, and 3 replace 20%, 33.3% and 50% by weight of the low $T_g$ polymer with an equal volume portion of the high $T_g$ polymer. Comparative Examples 2 and 3 replace 20% and 33.3% by weight of the low $T_g$ polymer with equal volumes of CaCO$_3$. In the Table, composition stability is evaluated in terms of settling (in mm) and viscosity change (in KU) of the aqueous composition after 7 days at 60° C. and settling (in mm) was evaluated after 1-month shelf stability testing at room temperature. 90% Relative humidity Dry No Pick-Up (per ASTM D-711) is reported in minutes. WT (Wheel Track) presence, which was measured on an unbeaded line 55 days after application, is reported as a percent in accordance with ASTM D913, and is a measure of durability. ΔE, as measured in accordance with ASTM D2244, is an indicator of color retention (smaller ΔE corresponds to less color change), and is reported as a percent of color change at 55 days of the Comparative Example 1 containing only soft polymer. The term high $T_g$:low $T_g$ refers to the v/v ratio of the two polymers; and CaCO$_3$:low $T_g$ refers to the v/v ratio of the additional CaCO$_3$ above what is used in the comparative example. CaCO$_3$, inorganics, polymer solids, soft polymer, hard polymer, water, volume solids, and weight solids are all reported based on weight of the total paint. The hard polymer is considered pigment for the PVC calculation. The word "Pass" is used to indicate the acceptable threshold for the measured property.

TABLE 1

| Properties of Paints with High $T_g$ Polymer | | | | | | | |
|---|---|---|---|---|---|---|---|
| Lab ID | Comp 1 | Ex 1 | Ex 2 | Ex 3 | Comp 2 | Comp 3 | Pass |
| High $T_g$:low $T_g$ | 0:100 | 20:80 | 33:67 | 50:50 | — | — | |
| CaCO$_3$:low $T_g$ | — | — | — | — | 20:80 | 33:67 | |
| 7-d HeatAge: Settling | 0 | 0 | 0 | 0 | 0 | 8.0 | <5 |
| 7-d HeatAge: ΔKU | 6.3 | 8.4 | 6.7 | 6.6 | 5.7 | 9.0 | <10 |
| 1-mo shelf Settling | 3.0 | 3.0 | 1.0 | 0 | 4.0 | 12.0 | <10 |
| 90% RH Dry No Pick-Up | 32 | 28 | 28 | 24 | 44 | 56 | <30 |
| WT % Presence | 100 | 100 | 100 | 98 | 100 | 30 | >80 |
| ΔE Color Change | 100.0% | 83.5% | 73.9% | 59.4% | 93.1% | 92.3% | <90% |
| Soft Polymer $T_g$ ° C. | −4 | −4 | −4 | −4 | −4 | −4 | |
| Hard Polymer $T_g$ ° C. | N/A | 58 | 58 | 58 | N/A | N/A | |
| Wt % CaCO$_3$ | 54.3% | 56.5% | 56.5% | 56.5% | 59.0% | 62.0% | |
| Wt % TiO$_2$ | 7.1% | 7.1% | 7.1% | 7.1% | 6.8% | 6.6% | |
| Wt % Inorganics | 61.4% | 63.6% | 63.6% | 63.6% | 65.8% | 68.6% | |
| weight % Polymer Solids | 15.1% | 15.1% | 15.1% | 15.1% | 11.6% | 9.4% | |
| weight % Soft Polymer | 15.1% | 12.1% | 10.1% | 7.6% | 11.6% | 9.4% | |
| weight % Hard Polymer | 0.0% | 3.0% | 5.0% | 7.6% | 0.0% | 0.0% | |
| PVC | 61.5 | 69.2 | 74.3 | 80.8 | 69.0 | 74.0 | |
| weight % Water | 0.2 | 0.2 | 0.2 | 0.2 | 0.2 | 0.2 | |
| Volume Solids | 60.0 | 60.0 | 60.0 | 60.0 | 59.8 | 59.9 | |
| Weight Solids | 77.0 | 77.0 | 77.0 | 77.0 | 77.7 | 79.4 | |

The data show across the board passing values for the tests for heat age settling, ΔKU, 90% RH dry no pick-up, and ΔE. In contrast, the comparative paints that do not contain the non-film forming second polymer particles as a partial substitute for the film-forming particles fail in one or more of the tests the paints were subjected to. Notably, all of the comparative paints fail for ΔE (color retention) and dry no pick-up.

The invention claimed is:

1. A method comprising the steps of a) applying a 0.1-mm to 2-mm thick layer of a pigmented coating composition onto a cement, concrete, or asphalt substrate, and b) allowing the coating composition to dry;
   wherein the pigmented coating composition comprises an aqueous dispersion of 1) first polymer particles having a calculated $T_g$ in the range of from −25° C. to 50° C.; 2) second polymer particles having a calculated $T_g$ in the range of from 30° C. to 110° C.; 3) extender particles; 4) pigment particles; and 5) a base which is ammonia or a volatile amine or a salt thereof;

with the proviso that the second polymer particles have a $T_g$ of at least 20° C. higher than the first polymer particles, wherein, based on the weight of the composition:

the first and second polymer particles together have a solids content in the range of from 10 to 20 weight percent;

the extender particles have a solids content in the range of from 45 to 70 weight percent;

the pigment particles have a solids content in the range of from 3 to 15 weight percent; and the composition has a total solids content in the range of from 60 to 85 weight percent;

wherein the w/w ratio of the first polymer particles to the second polymer particles is in the range of from 30:70 to 90:10;

wherein the first and second polymer particles consist of acrylic or styrene-acrylic polymer particles.

2. The method of claim 1 wherein the pigment is $TiO_2$; the first polymer particles have $T_g$ in the range of from −15° C. to 30° C. and the second polymer particles have a $T_g$ in the range of from 50° C. to 110° C.

3. The method of claim 2 wherein the pigmented coating composition further comprises from 0.01 to 2 weight percent, based on the weight of the composition, of a polyamine; wherein the weight-to-weight ratio of first polymer particles to the second polymer particles is in the range of from 50:50 to 90:10.

4. The method of claim 3 wherein the composition has a pigment volume concentration (PVC) is the range of from 60 to 90.

5. The method of claim 4 wherein the base is ammonia, 2-amino-2-methyl-1-propanol, dimethylaminoethanol, or monoisopropanol amine; wherein the polyamine is poly (oxazolidinoethyl methacrylate); and wherein the composition has a pH in the range of from 8.5 to 12.

6. The method of claim 4 wherein the composition has a PVC is in the range of from 65 to 85.

7. The method of claim 6 wherein the composition further comprises a surfactant, a defoamer, a dispersant, and a rheology modifier.

8. The method of claim 1 wherein the composition further comprises one or more additional materials selected from the group consisting of surfactants, defoamers, dispersants, coalescents, rheology modifiers, and solvents.

9. The method of claim 1 wherein the composition comprises a coalescent at a high enough concentration to promote film formation of the first polymer particles at ambient temperature, but low enough so as not to promote film formation of the second polymer particles at ambient temperature.

10. The method of claim 1 which further comprises, before step b), the drop-on addition to the substrate of glass beads, sand, quartz, $Al_2O_3$, or bauxite, or a combination thereof.

11. A method comprising the steps of a) applying a 0.1-mm to 2-mm thick layer of a pigmented coating composition onto a cement, concrete, or asphalt substrate, and b) allowing the coating composition to dry;

wherein the pigmented coating composition comprises an aqueous dispersion of 1) first polymer particles having a calculated $T_g$ in the range of from −25° C. to 50° C.; 2) second polymer particles having a calculated $T_g$ in the range of from 30° C. to 110° C.; 3) extender particles; 4) pigment particles; and 5) a base which is ammonia or a volatile amine or a salt thereof;

with the proviso that the second polymer particles have a $T_g$ of at least 20 C° higher than the first polymer particles, wherein, based on the weight of the composition:

the first and second polymer particles together have a solids content in the range of from 10 to 20 weight percent;

the extender particles have a solids content in the range of from 45 to 70 weight percent;

the pigment particles have a solids content in the range of from 3 to 15 weight percent;

the composition has a total solids content in the range of from 60 to 85 weight percent; and wherein the w/w ratio of the first polymer particles to the second polymer particles is in the range of from 30:70 to 90:10; and wherein the first polymer particles are film-forming, and the second polymer particles are not film-forming.

12. The method of claim 11 wherein the first and second polymer particles are acrylic or styrene-acrylic polymer particles; the pigment is $TiO_2$; the first polymer particles have $T_g$ in the range of from −15° C. to 30° C. and the second polymer particles have a $T_g$ in the range of from 50° C. to 110° C.

13. The method of claim 12 wherein the pigmented coating composition further comprises from 0.01 to 2 weight percent, based on the weight of the composition, of a polyamine; wherein the weight-to-weight ratio of first polymer particles to the second polymer particles is in the range of from 50:50 to 70:30; and wherein the first and second polymer particles are acrylic polymer particles.

14. The method of claim 13 wherein the acrylic polymer particles consist of structural units of methyl methacrylate and one or more monomers selected from the group consisting of methyl acrylate, ethyl acrylate, n-butyl acrylate, 2-ethylhexyl acrylate, 2-propylheptyl acrylate, methacrylic acid and a salt thereof, acrylic acid and a salt thereof, itaconic acid and a salt thereof, sulfoethyl methacrylate and a salt thereof, sulfopropyl methacrylate and a salt thereof, styrene sulfonic acid and a salt thereof, vinyl sulfonic acid and a salt thereof, 2-acrylamido-2-methyl propanesulfonic acid and a salt thereof; and 2-phosphoethyl methacrylate and a salt thereof.

15. The method of claim 14 wherein the composition has a pigment volume concentration (PVC) is the range of from 65 to 85.

16. The method of claim 11 wherein the composition further comprises a surfactant, a defoamer, a dispersant, and a rheology modifier.

17. The method of claim 16 wherein the composition comprises a coalescent at a high enough concentration to promote film formation of the first polymer particles at ambient temperature.

* * * * *